May 25, 1965 D. B. BORKUM 3,185,859
DELAYED-RESPONSE SIGNAL TRANSFER CIRCUIT
Filed Feb. 15, 1960 2 Sheets-Sheet 1

INVENTOR
DAVID B. BORKUM
BY
ATTORNEY

INVENTOR
DAVID B. BORKUM
BY Henry Huff
ATTORNEY

United States Patent Office 3,185,859
Patented May 25, 1965

3,185,859
DELAYED-RESPONSE SIGNAL TRANSFER CIRCUIT

David B. Borkum, Valley Stream, N.Y., assignor to Sperry Rand Corporation, Great Neck, N.Y., a corporation of Delaware Filed Feb. 15, 1960, Ser. No. 8,826
14 Claims. (Cl. 307—88.5)

This invention relates to delay circuits and more particularly to delayed-response information transfer circuits for use in information storage systems such as shifting registers and the like.

A conventional form of shifting register employed in the digital computer field includes a plurality of "cascaded" bistable flip-flops, one for each binary digit to be stored. Successive flip-flops are coupled through delay circuits. A shift pulse applied simultaneously through a common bus to the inputs of the respective flip-flops sets each flip-flop to "0." Each flip-flop that is storing a "1" is set to "0" by the shift pulse, and this change applies a signal to the delay circuit which provides a delayed signal that sets the following flip-flop to "1" after the shift pulse is gone. Thus, binary information stored in the register is shifted one stage (flip-flop) in response to each shift pulse.

The coupling circuit between stages must: detect the reversal of the driving flip-flop from the "1" state to the "0" state; convert this change into a signal capable of changing the next stage to a "1"; and delay this signal until the shift pulse disappears. The coupling circuit must be insensitive to changes in the reverse direction, i.e., from the "0" state to the "1" state. Various circuits have been proposed in the prior art to meet these conditions. However, they are generally quite complex or limited in accuracy and speed.

In accordance with one embodiment of the invention, a delayed-response transfer circuit for coupling, with high speed and accuracy, successive bistable flip-flops of a shifting register includes an electron device, for example a transistor, with a control electrode connected through an input capacitor to one and through a resistor to the other of the two output lines of the driving flip-flop. A reversal of state of the driving flip-flop tends, through the resistor, to reverse the bias on the control electrode and thus change the then conduction state ("on" or "off") of the above-mentioned transistor. Concomitantly, the reversal of state of the driving flip-flop produces a pulse through the capacitor onto the control electrode of the transistor in the direction tending to maintain the then conduction state of the transistor. The pulse initially offsets the tendency to reverse the bias on the control electrode but decays exponentially until it is no longer sufficient to maintain the then conduction state of the transistor. At this time there is produced at the output of the transistor a delayed step voltage which follows in polarity the step voltage applied by the driving flip-flop to the input capacitor. The output of the transfer transistor is coupled to the input of the following flip-flop through a capacitor and resistive type of differentiator which converts the step wave to a narrow like-polarity pulse for triggering the following or driven flip-flop. Feedback from the driven flip-flop when in the "1" state, is applied to the transfer transistor in a manner inhibiting this transistor from transmitting a signal when the driving flip-flop is changing from the "0" state to the "1" state.

The delay transfer circuit per se, and when coupled with a step voltage source, has independent utility to provide delayed-responsive information transfer and a delayed-response step wave.

It is therefore an object of the present invention to provide a novel delayed-response information transfer circuit.

Another object is to provide a novel delayed-response signal generator.

Another object is an information register circuit employing flip-flop stages coupled by the aforesaid novel delayed-response transfer circuit.

A further object is the attainment of high accuracy and speed in the aforesaid circuits.

Other and further objects and advantages of the present invention will be apparent from the following description, reference being had to the accompanying drawings wherein a preferred form of the present invention is clearly shown.

Figure 1:
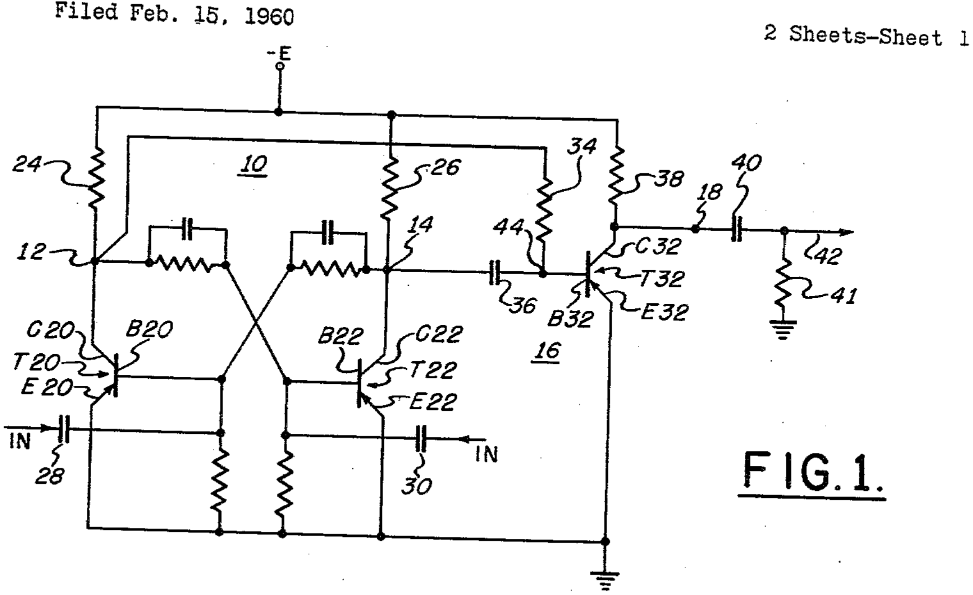
FIG. 1 is a diagram of a delayed-response step voltage generator embodying the invention.

The delayed response signal generator shown in FIG. 1 includes a two-mode step signal source 10 with reversible output terminals 12 and 14, which, in one mode of the source respectively provide first and second voltage levels, and the reverse thereof in the other mode. A simple example of such a source is a battery whose terminals are connected to two output terminals through a reversing switch. Another example is a bistable flip-flop such as the bistable multivibrator shown at 10. Connected to the output source 10 is a delayed-response transfer circuit 16 which at its output terminal 18 provides a signal in delayed response to change of said source from either one to the other of its modes, the direction of the signal being dependent on the mode to which the source changes.

The flip-flop 10 is conventional and includes a pair of cross-coupled inverting electron devices, the PNP transistors T20 and T22 in grounded emitter configuration. In the grounded emitter configuration, the base is the input control electrode, the collector is the output electrode and the emitter is an electrode common to the input and output circuits of the transistor. Collectors C20 and C22 of the transistors T20 and T22 are respectively connected to the output terminals 12 and 14, and through load resistors 24 and 26 to a source of negative potential −E, while the respective emitters E20 and E22 of these transistors are connected to a reference potential which may be ground. In one stable state of the flip-flop, transistor T20 is "on" (conducting) while T22 is "off" (not conducting), thus providing a first voltage level (ground) at output terminal 12 and a second voltage level (−E) at output terminal 14. All these conditions are reversed for the other state of the flip-flop, i.e., transistors T20 and T22 are respectively "off" and "on," and terminals 12 and 14 are respectively at −E and ground. The flip-flop is set to one state by applying a suitable input pulse through a capacitor 28 to the base B20 of the transistor T20, and to the other state by a pulse through a capacitor 30 to the base B22 of transistor T22. It will be appreciated that other well known methods of triggering the flip-flop to its respective stable states may be employed. The action of the flip-flop is conventional and further description is not required.

The delayed response transfer circuit 16 includes an electron device T32 with an input control electrode B32 connected through a resistor 34 to output terminal 12 of the flip-flop, and through a capacitor 36 to the other output terminal 14. The electron device may, for example, be the transistor shown at T32 in grounded emitter configuration, the transistor having an emitter E32 coupled to ground, a collector C32 connected to output terminal 18 and through a load resistor 38 to the source of negative potential —E, and a base B32 connected to the flip-flop output terminals as hereinbefore described. If desired, step outputs at terminal 18 may be differentiated by an output capacitor 40 connected between terminal 18 and a terminal 42, and a resistor 41 connected between terminal 42 and ground.

Resistor 34 and capacitor 36 are connected in series with each other between terminals 12 and 14, and the junction 44 between the resistor and capacitor is connected to the base B32.

Figure 2:
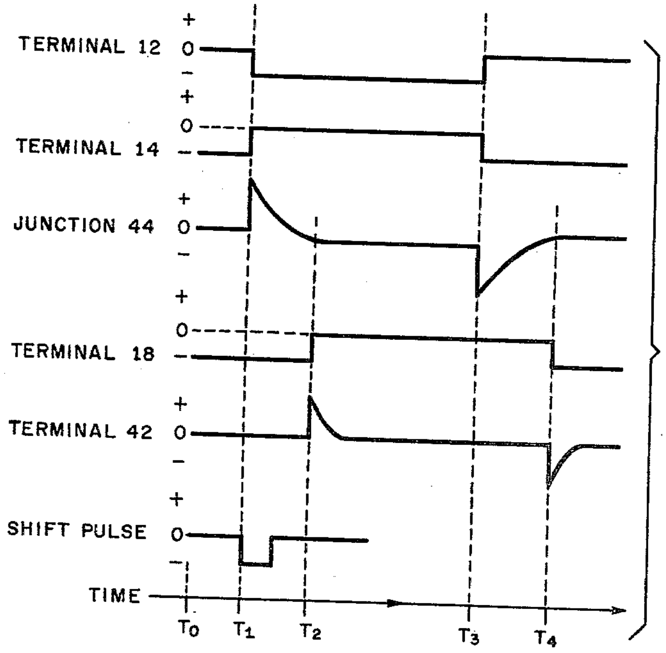
FIG. 2 is a chart of waveforms depicting operation of the circuit in FIG. 1.

Understanding of the operation of the circuit in FIG. 1 is aided by the waveforms in FIG. 2 wherein action starts from an initial stable condition with transistor T20 "on" and transistor T22 "off." In this condition flip-flop output terminal 12 is at zero or ground potential, while the other output terminal 14 is at a minus potential. This produces a corresponding charge on capacitor 36 and biases the transistor base B32 positive to turn off transistor T32. With this transistor "off," terminal 18 is at —E potential. The above-described initial conditions at the various circuit points are indicated between times T0 and T1 in FIG. 2.

At time T1 (FIG. 2), the flip-flop is reversed with a proper input pulse turning transistor T20 off and transistor T22 on, thus reversing the previous voltage levels at the output terminals, terminal 12 now being at the minus potential, while terminal 14 is at ground potential. This reverses the polarity across the capacitor 36, producing a positive pulse at terminal 44 at time T1, which pulse decays exponentially toward ground as the capacitor discharges. At time T2, the pulse decay reaches a minus potential, turning "on" transistor T32 and causing terminal 18 to go from —E to ground, thereby providing a step output similar to the step input supplied to the transfer circuit by terminal 14, but delayed by the time between T1 and T2.

The reverse operation is shown beginning at time T3 in response to a reversal of the flip-flop to the state wherein transistor T20 is "on" and transistor T22 is "off." Thus, at time T3 terminals 12 and 14 go to ground and minus potentials respectively, reversing the polarity across the condenser 36, and producing a negative pulse at terminal 44 which will decay exponentially and turn "off" transistor T32 when the decay reaches ground potential at time T4. Turning "off" transistor T32 results in terminal 18 going negative at time T4, thus producing a step voltage similar to that supplied by terminal 14 but delayed by the time between T3 and T4.

It may be noted that the pulses due to capacitor 36 at terminal 44 are in the aiding direction with respect to the base potential necessary to maintain the then "off" or "on" state of the transfer transistor T22, reversal of the transistor taking place as a result of the oppositely going potential decay of the pulse to the potential level required for reversal (supplied by resistor 34). For example, just before time T1 the base B32 is positive with respect to the emitter and the pulse at time T1 at terminal 44 is positive, and thereby in the direction tending to maintain the then condition ("off") of the transistor. There is a slight difference between the decay times of the positive and negative pulses. This is due to differences in the base-emitter resistance in the "on" and "off" conditions of the transistor. The waveforms at terminal 42 (FIG. 2) show the conversion of the step output at terminal 18 to pulses by the capacitor 40.

Figure 3:
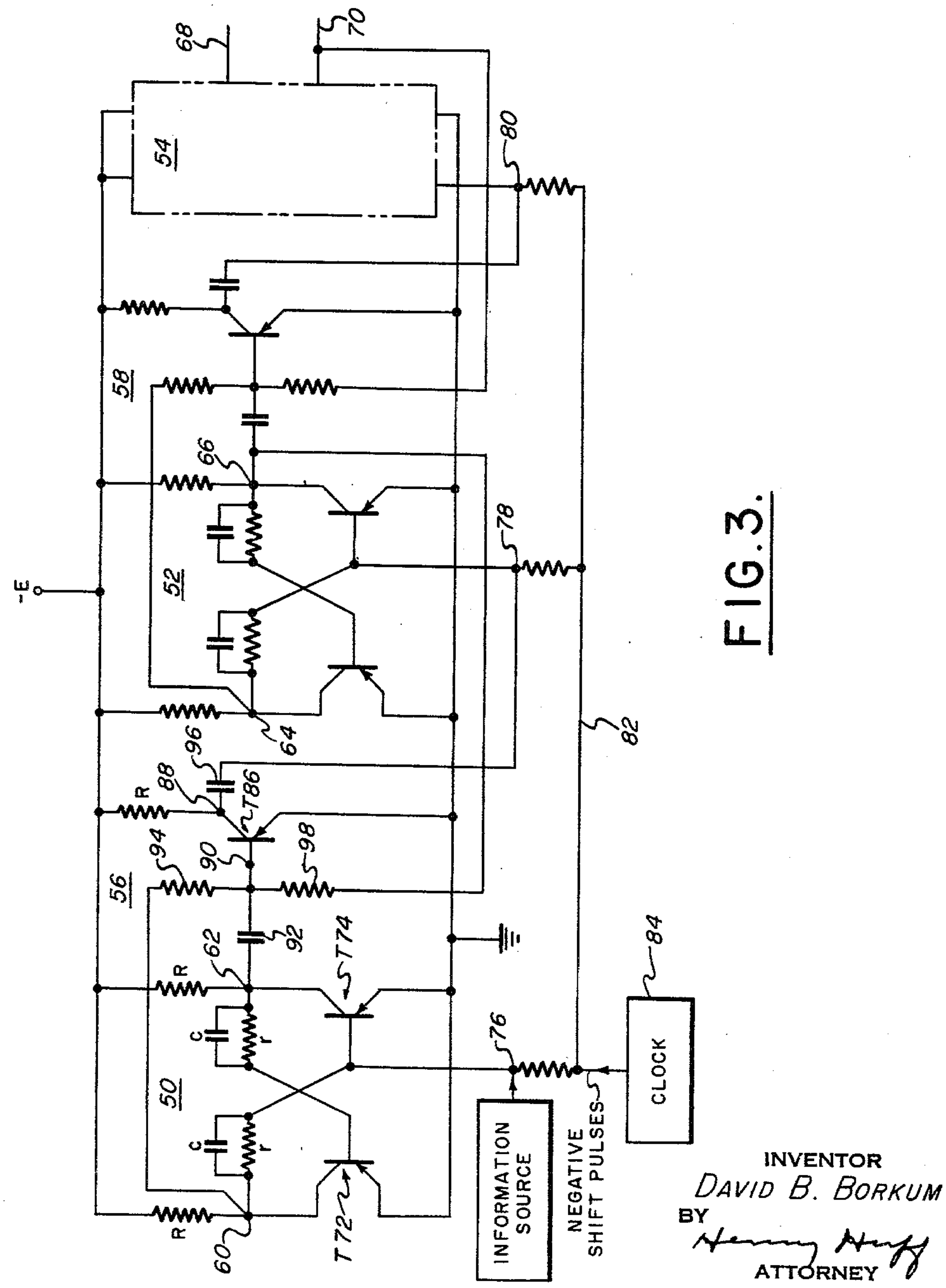
FIG. 3 is a diagram of a shift register embodying the invention.

In FIG. 3 the above-described circuits are shown employed in a binary shifting register which includes similar "cascaded" flip-flops 50, 52 and 54, with adjacent flip-flops coupled by the above-described delayed response transfer circuits. These are indicated generally at 56 and 58 in FIG. 3.

Flip-flops 50, 52 and 54 are similar to flip-flop 10 in FIG. 1, and the transfer circuits 56 and 58 are similar to transfer circuit 16 of FIG. 1. The reversible output terminals for flip-flop 50 are indicated at 60 and 62, for flip-flop 52 at 64 and 66, and for flip-flop 54 at 68 and 70. Any of the flip-flops 50, 52 and 54 shall be considered as storing a binary "1" when the left transistor in the flip-flop is "on" while the right transistor is "off." For example, the flip-flop 50 is in the "1" state when its left transistor T72 is "on" and the flip-flop's output terminals 60 and 62 are respectively at ground and —E potentials. The reverse of these conditions represents the "0" state of the flip-flop. In the latter state of flip-flop 50, its right transistor T74 would be "on" while the flip-flop's output terminals 60 and 62 would be respectively at —E and ground potentials.

Each of the flip-flops is provided with an input terminal connected to the base of the right transistor. These input terminals are indicated at 76, 78 and 80, respectively, for flip-flops 50, 56 and 58. For example, input terminal 76 of flip-flop 50 is connected to the base of its right transistor T74. A negative pulse applied to the input terminal 76 sets the flip-flop 50 in the "0" state, if it is not already in that state. Conversely, a positive pulse applied to the input terminal 76 sets this flip-flop in the "1" state. The other flip-flops operate in the same manner in response to the same kind of stimuli. All of the flip-flops are cleared (set to "0") simultaneously in response to negative shift pulses supplied from a bus 82 through isolating resistors to the respective input terminals 76, 78 and 80. Bus 82 may be connected to a source of negative pulses, for example, a computer clock 84. Input 76 of flip-flop 50 is also connected to a source of binary information, which may be the output of a previous stage or some other source.

The transfer circuit 56 includes a transistor T86 with an output electrode terminal 88 and a control electrode terminal 90 connected as in FIG. 1 through a capacitor 92 to output terminal 62, and through a resistor 94 to output terminal 60. The output of the transfer transistor T86 is coupled to the input 78 of flip-flop 52 through a capacitor 96 connected between terminals 88 and 78. If any of the flip-flops is in the "1" state, the arrival of the shift pulse will reverse the flip-flop from the "1" to the "0" state, and as a result the transfer circuit associated with the output of that flip-flop transmits a positive pulse to the input of the succeeding flip-flop after the shift pulse is gone, thus setting the latter flip-flop in the "1" state. For example, assuming that the flip-flop 50 is in the "1" state and flip-flop 52 is in the "0" state, a shift pulse will reverse the flip-flop 50 from the "1" to the "0" state, which change produces a positive pulse at terminal 90 that decays to a negative level at which the transfer transistor T86 is turned "on" thereby raising the potential at terminal 88 from —E to ground. This in turn applies through capacitor 96 a positive pulse to input terminal 78 of the flip-flop 52, thus storing a "1" in the latter flip-flop. To prevent interference between the information or transfer pulses and the shift pulses, the time that it takes a positive pulse at 90 to decay to a negative level low enough to turn the transfer transistor T86 "on" must be greater than the width of the shift pulse. This is graphically illustrated in FIG. 2 where an isolated shift pulse in its proper time slot is shown as being narrower than the time between T1 and T2.

Unless it is prevented, each time a flip-flop changes from the "0" to the "1" state (which occurs when a "1" is shifted to the next stage), the following transfer circuit will apply a negative pulse to the input of the succeeding flip-flop. This is of no consequence if the latter flip-flop is already in the "0" state. However, if the succeeding or driven flip-flop is in the "1" state, the negative pulse applied to it in response to the reversal of the preceding driving flip-flop from the "0" to the "1" state will undesirably cause a reversal of the driven flip-flop. To prevent this, feedback from the driven flip-flop when in the "1" state, is applied to the preceding transfer transistor in a manner to inhibit this transistor from transmitting a signal when the driving flip-flop is reversing from the "0" to the "1" state. This is effected in the illustrated embodiment by the feedback from the output of the right transistor of the driven flip-flop through a resistor to the control electrode of the transistor in the preceding transfer circuit. For example, output terminal 66 of flip-flop 52 is connected to terminal 90 through a resistor 98. Similar feedback lines are provided between the other stages of the register.

When the driven flip-flop is in the "1" state, the feedback line from its output to the preceding transfer transistor, applies a negative potential to the base of the transfer transistor, thereby preventing the positive-going decay of the pulse supplied through the capacitor from the driving flip-flop from reaching a level sufficient to cut off the transfer transistor. As a result, there is no negative-going change in the output of the transfer transistor and no damaging pulse can reach the driven flip-flop. For example, when flip-flop 50 is in the "0" state and flip-flop 52 is in the "1" state, the feedback from output terminal 66 to terminal 90 applies a negative hold-off bias to the base of the transfer transistor 86 so that when a positive information pulse applied to terminal 76 reverses flip-flop 50 from the "0" to the "1" state, the resulting positive-going bias supplied through the resistor 94 to terminal 90, will not be high enough to counter the negative potential supplied by resistor 98 and therefore to turn "off" transistor T86. Since transistor T86 remains turned "on," there is no negative-going change at the terminal 88 and therefore no negative pulse is transmitted to input terminal 78.

In a particular example where the minimum width of a shift pulse needed to set the flip-flop to "0" was .20 microsecond, a total delay of .3 microsecond (time between T1 and T2 in FIG. 2), was obtained in a shift register as illustrated and having the following parameters:

| | | |
|---|---|---|
| E | volts | 4.5 |
| Resistors $r$ | ohms | 8,200 |
| Resistors R | do | 1,600 |
| Resistor 94 | do | 3,000 |
| Resistor 98 | do | 10,000 |
| Capacitors $c$ | micromicrofarads | 20 |
| Capacitor 92 | do | 100 |
| Capacitor 96 | do | 51 |

This shift register was operated at shifting frequencies of 1.0 and 1.5 megacycles. When operated at 1.0 megacycle, the shifting pulse width could be varied from .20 microsecond to .28 microsecond and the supply voltage could be varied ±30% without imparing the operation of the register. For lower frequencies, the delay can be more, allowing a greater variation of shifting pulse widths.

The output terminals 68 and 70 of flip-flop 54 may be coupled to other computing circuits, or if it is desired, to increase the number of stages in the register, stage 54 may be coupled through a transfer circuit of the type disclosed herein to a succeeding stage.

While the form of the embodiment of the invention as herein disclosed constitutes a preferred form, it is to be understood that other forms might be adopted, all coming within the scope of the claims which follow.

What is claimed is:

1. A delayed-response signal generator comprising a source having a pair of reversible output terminals for respectively supplying first and second voltage levels in one mode of operation and the reverse thereof in a second mode of operation, an electron device having an output circuit and an input control electrode, means for causing said electron device to produce in its output circuit a step voltage in a delayed response to change from one to the other of said modes of operation, said means comprising a resistor having one end connected to one of said output terminals, a capacitor having one side connected to the other of said output terminals, a junction connecting the other end of the resistor to the other side of the capacitor, and a connection from said junction to said control electrode.

2. The apparatus of claim 1 wherein said generator is a bistable flip-flop, and said electron device is a transistor.

3. A delayed-response signal generator comprising a source having a pair of reversible output terminals for respectively supplying first and second voltage levels in one mode of operation and the reverse thereof in a second mode of operation, an electron device having an input control electrode and an output circuit, means for causing said electron device to produce in its output circuit a step voltage in one direction in a delayed response to change from one to the other of said modes of operation and a step voltage in the opposite direction in a delayed response to change from said other to said one mode of operation, said means comprising a resistor having one end connected to one of said output terminals, a capacitor having one side connected to the other of said output terminals, a junction connecting the other end of the resistor to the other side of the capacitor, said junction being connected to said control electrode, each of said step voltages being in the same direction as the voltage applied to said one side of the capacitor by said other output terminal in response to the mode change producing that step.

4. The apparatus of claim 3 wherein said generator is a bistable flip-flop, and said electron device is a transistor.

5. A delayed-response signal generator comprising a source having a pair of reversible output terminals for respectively supplying first and second voltage levels in one mode of operation and the reverse thereof in a second mode of operation, an electron device having an input control electrode and an output circuit, means responsive to reversal from one to the other of said modes of operation for applying to said control electrode a pulse in the direction tending to maintain the then "on" or "off" condition state of the device but which decays to a level that sets the device to the other "on" or "off" conduction state, said means comprising a resistor having one end connected to one of said output terminals, a capacitor having one side connected to the other of said output terminals, a junction connecting the other end of the resistor to the other side of the capacitor, and a connection from said junction to said control electrode.

6. The apparatus of claim 5 wherein said generator is a bistable flip-flop and said electron device is a transistor.

7. A shifting register comprising first and second bistable flip-flops, the first having first and second output terminals which in one stable state of the first flip-flop respectively supply first and second voltage levels, and the reverse thereof in the other stable state of the first flip-flop, a delayed-response transfer circuit comprising a resistor having one end connected to one of said output terminals of the first flip-flop, a capacitor having one end connected to the other output terminal of the first flip-flop, a junction connecting the other end of the resistor and the other side of the capacitor, and an electron device having an input control electrode connected to said junction, said device having an output electrode, said second flip-flop being connected to respond to signals supplied by said output electrode.

8. The apparatus of claim 7 wherein said electron device is a transistor.

9. A shifting register comprising first and second bistable flip-flops, the first having first and second output terminals which in one stable state of the first flip-flop respectively supply first and second voltage levels, and the reverse thereof in the other stable state of the first flip-flop, a delayed-response transfer circuit comprising a resistor having one end connected to one of said output terminals of the first flip-flop, a capacitor having one end connected to the other output terminal of the first flip-flop, a junction connecting the other end of the resistor and the other side of the capacitor, an electron device having an input control electrode connected to said junction, said device having an output electrode, said second flip-flop being connected to respond to signals supplied by said output electrode, and feedback means coupled from the output of the second flip-flop to said electron device and responsive to a particular one only of the stable states of the second flip-flop for preventing the electron device from responding to the first flip-flop in a manner which would produce an output signal that would reverse the state of the second flip-flop.

10. Information storage apparatus comprising first and second bistable flip-flops, each having an input and an output including first and second output terminals respectively providing first and second output signal levels to represent one stable state of the flip-flop and the reverse thereof to represent the other stable state of the flip-flop, means for applying a shift pulse to the respective inputs of said flip-flops to set into a particular one of the stable states, all those flip-flops not already in said one state, means for reversing the second flip-flop from said one to the other of its stable states in response to the reversal of the first flip-flop from said other to said one of its stable states comprising a circuit coupling the output of the first flip-flop to the input of the second flip-flop, said circuit including a resistor, a capacitor and an electron device having a control electrode connected through said resistor to one and through said capacitor to the other of said output terminals of the first flip-flop, said device having an output electrode coupled to the input of the second flip-flop, said electron device being responsive to change from said other to said one state of the first flip-flop to provide an output for setting the second flip-flop in said other state, said electron device being responsive to change from said one to said other state of the first flip-flop to provide an output which tends to set the second flip-flop in said one state, and means responsive to said other state of the second flip-flop for inhibiting said electron device from reversing the state of the second flip-flop.

11. The apparatus of claim 10 wherein said electron device is a transistor.

12. Information storage apparatus comprising first and second bistable flip-flops, each having an input and an output including first and second output terminals respectively providing first and second output signal levels to represent one stable state of the flip-flop and the reverse thereof to represent the other stable state of the flip-flop, means for applying a shift pulse to the respective inputs of said flip-flops to set into a particular one of the stable states all those flip-flops not already in said one state, means for reversing the second flip-flop from said one to said other of its stable states in response to the reversal of the first flip-flop from said other to said one of its states comprising a circuit coupling the output of the first flip-flop to the input of the second flip-flop, said circuit including an electron device having a control electrode, and means responsive to a reversal of states of the first flip-flop for applying to said control electrode a pulse peaking in the direction tending to maintain the then obtaining one of the "on" and "off" conduction states of the electron device, but decaying to a level that switches the device to the other of said "on" and "off" conduction states, the latter means including a resistor having one end coupled to one of said output terminals, a capacitor having one side coupled to the other of said output terminals, and a junction connecting the other end of the resistor to the other side of the capacitor, said junction being connected to said control electrode, said second flip-flop being connected to respond to said electron device.

13. The apparatus of claim 12 wherein said electron device is a transistor.

14. Information storage apparatus comprising first and second bistable flip-flops, each having an input and an output including first and second output terminals respectively providing first and second output signal levels to represent one stable state of the flip-flop and the reverse thereof to represent the other stable state of the flip-flop, means for applying a shift pulse to the respective inputs of said flip-flops to set into a particular one of the stable states, all those flips-flops not already in said one state, means for reversing the second flip-flop from said one to said other of its stable states in response to the reversal of the first flip-flop from said other to said one of its states comprising a circuit coupling the output of the first flip-flop to the input of the second flip-flop, said circuit including an electron device having a control electrode, means responsive to a reversal of states of the first flip-flop for applying to said control electrode a pulse peaking in the direction tending to maintain the then obtaining one of the "on" and "off" conduction states of the electron device, but decaying to a level that switches the device to the other of said "on" and "off" conduction states, the latter means comprising a resistor having one end coupled to one of said output terminals, a capacitor having one side coupled to the other of said output terminals, and a junction connecting the other end of the resistor to the other side of the capacitor, said junction being connected to said control electrode, and a capacitor through which the output of said device is coupled to the input of the second flip-flop.

References Cited by the Examiner

UNITED STATES PATENTS

| | | | |
|---|---|---|---|
| 2,536,808 | 1/51 | Higinbotham | 328—42 |
| 2,547,434 | 4/51 | Bergfors | 328—49 |
| 2,636,984 | 4/53 | Canfora | 328—192 |
| 2,678,390 | 5/54 | Abelew | 328—49 |
| 2,703,678 | 3/55 | Hopkins et al. | 328—51 |
| 2,906,892 | 9/59 | Jones | 307—88.5 |
| 2,956,181 | 10/60 | Norman | 328—525 |
| 2,964,735 | 12/60 | Abbott | 328—37 |

JOHN W. HUCKERT, *Primary Examiner.*

HERMAN KARL SAALBACH, *Examiner.*